Nov. 12, 1957 W. H. NEELY 2,812,803
WIRE SPRING STRUCTURE
Filed July 13, 1953 5 Sheets-Sheet 1
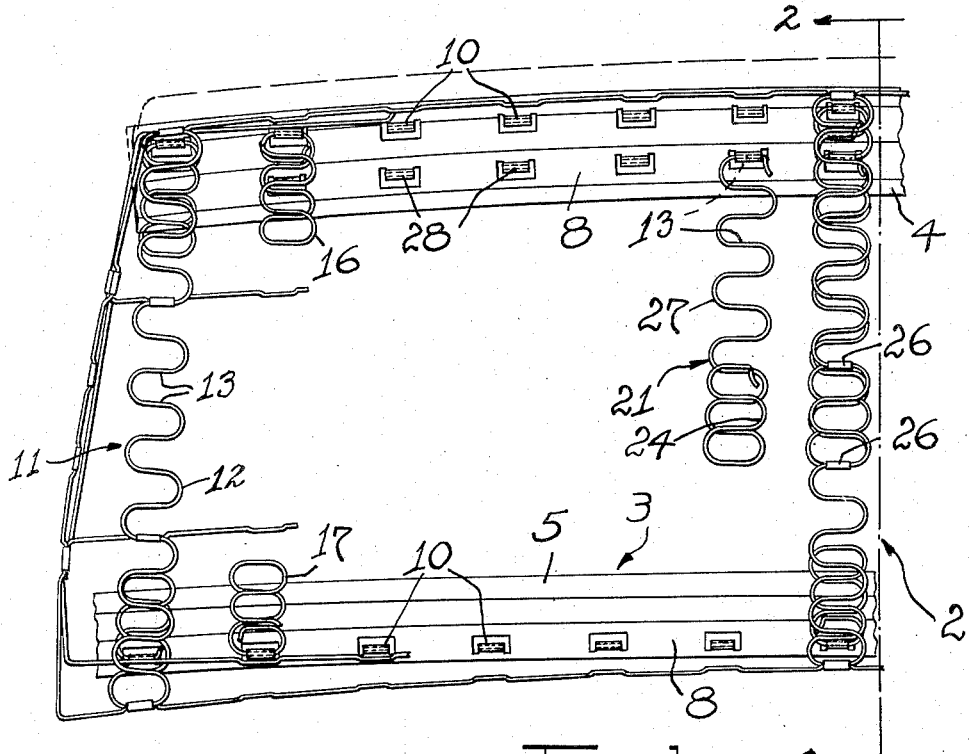
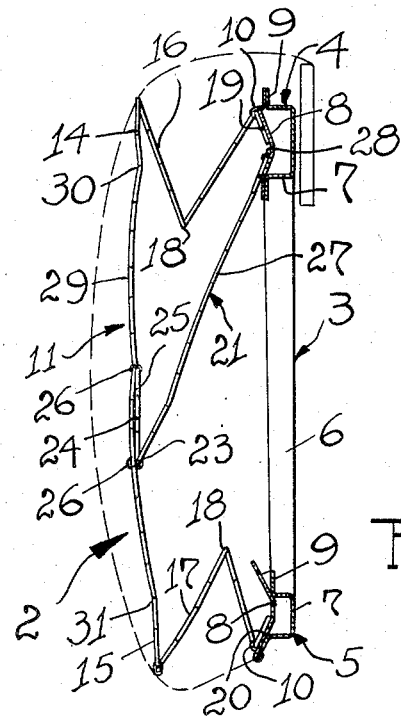
INVENTOR.
WILLIAM H. NEELY
BY
Gustav A. Wolff
ATT.

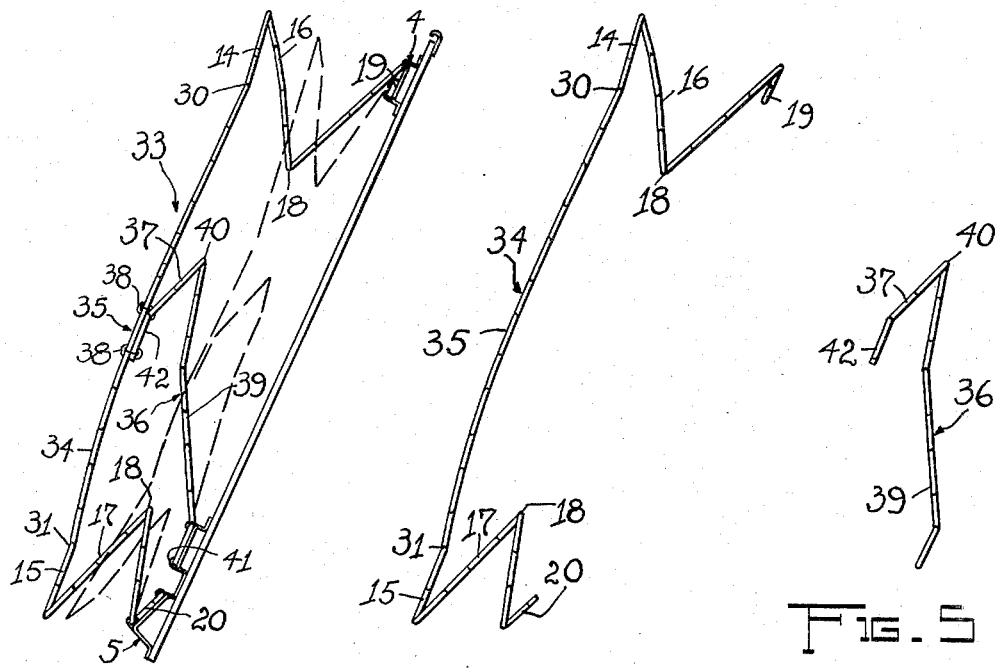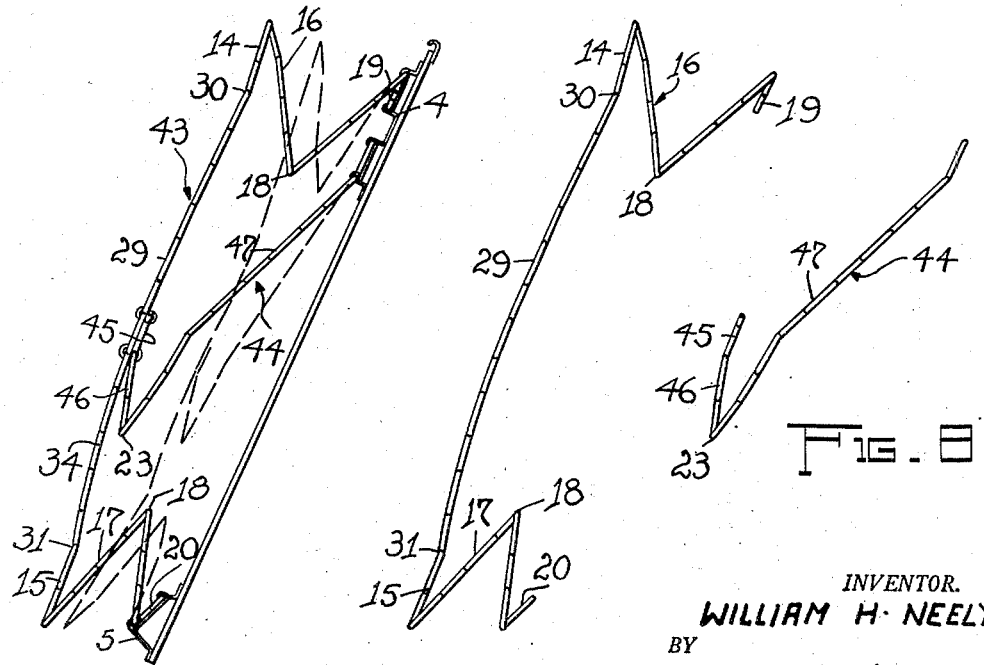

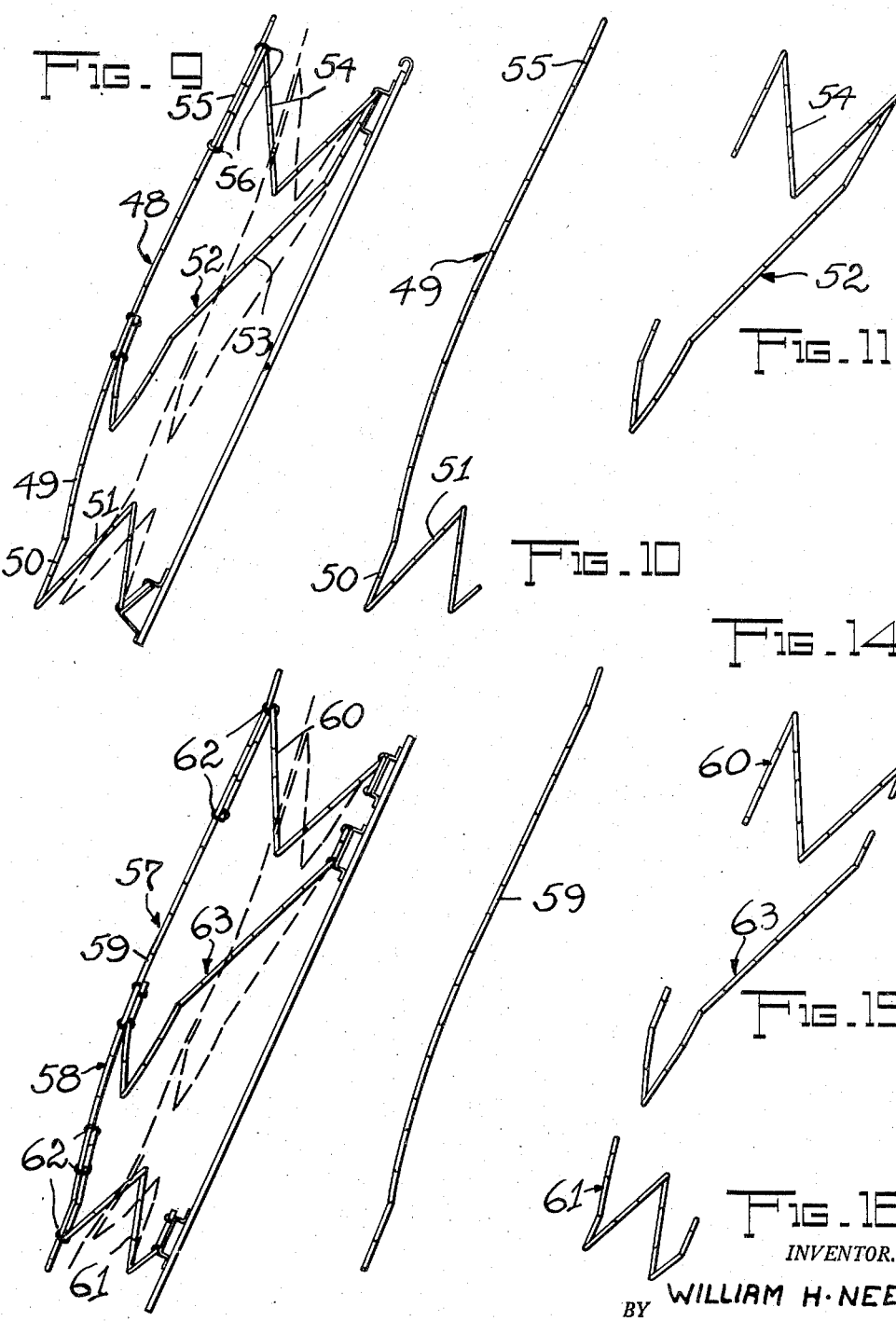

Nov. 12, 1957  W. H. NEELY  2,812,803
WIRE SPRING STRUCTURE
Filed July 13, 1953  5 Sheets-Sheet 4
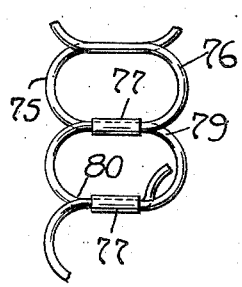
Fig. 19
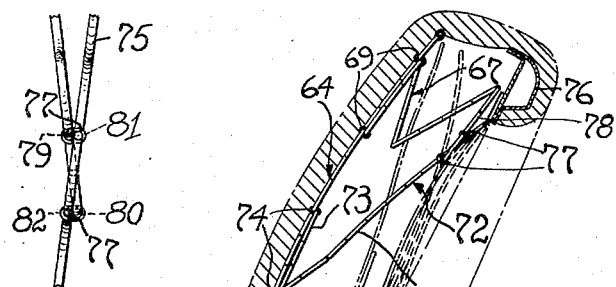
Fig. 20
Fig. 17
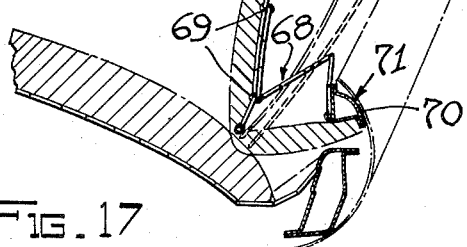
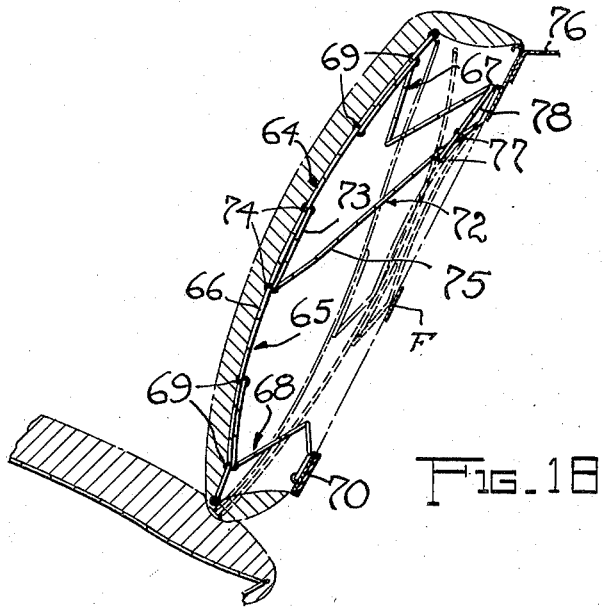
Fig. 18
INVENTOR.
WILLIAM H. NEELY
BY
Gustav A. Wolff
ATT Nov. 12, 1957 W. H. NEELY 2,812,803
WIRE SPRING STRUCTURE
Filed July 13, 1953 5 Sheets-Sheet 5

INVENTOR.
WILLIAM H. NEELY
BY
ATT.

United States Patent Office 2,812,803
Patented Nov. 12, 1957

2,812,803

WIRE SPRING STRUCTURE

William H. Neely, Cleveland, Ohio, assignor to The Universal Wire Spring Company, Bedford, Ohio, a corporation of Ohio Application July 13, 1953, Serial No. 367,450

10 Claims. (Cl. 155—179)

This invention relates to improvements in upholstered seat and back constructions and has particularly reference to upholstered spring constructions for vehicles and furniture.

Spring constructions of this type, which should be soft and yielding, of sufficient resistance to extreme deflection and of minimum thickness while giving the feel of considerable depth, heretofore have been constructed to include two elongated, sinuously corrugated wire members arranged opposite to each other and spaced from each other by corrugated wire elements of zig-zag configuration interposed between the spaced, sinuously corrugated wire members and rigidly attached thereto to yieldingly connect such members in spaced relation with each other. However, spring structures of this type cannot be constructed to provide both, proper yield and proper load resistance, as the yield and the load-carrying ability of a spring are opposed to each other and as the yield and load-carrying ability of the spring structures are primarily controlled by zig-zag shaped wire elements arranged between the corrugated wire members of the spring structures.

The general object of this invention is the provision of a sinuously corrugated, composite wire spring structure which includes an elongated, sinuously corrugated wire member having yielding supporting and attachment means at its opposite ends, and a V-shaped, cantilever-like supporting member having two angularly related arms of different length, the shorter arm being rigidly attached to the bottom face of the wire member in its central area and the longer arm being extended in angular relation to the wire member toward and in proximity to the outer end of one of the supporting and attachment means of such wire member.

This general object of the invention is attained by a sinuously corrugated, composite wire spring structure which has the yielding supporting and attachment means of its elongated, sinuously corrugated wire member formed as integral portions of the wire member or formed as individually pre-shaped elements secured to the ends of the elongated, sinuously corrugated wire member and includes a V-shaped, cantilever-like supporting member shaped from a wire of sinuous configuration and torsionally twisted between adjacent left and right-handed loops to provide a V-shaped, cantilever-like member with a sharp apex and two arms of different length, the shorter arm being secured to the central bottom portion of the elongated, sinuously corrugated wire member and the longer arm being extended toward the end of one of the supporting and attachment means of the elongated, sinuously corrugated wire member.

Another object of the invention therefore is the provision of a sinuously corrugated, composite wire spring structure which includes a single elongated, sinuously corrugated wire member having supporting and attachment means secured to at least one end and a V-shaped, cantilever-like supporting member with two angularly related arms of different length, the shorter arm being secured to the central bottom portion of the elongated wire member and the longer arm being extended at an angle to the wire member in a direction toward and in proximity to the outer end of the said one supporting and attachment means of the wire member.

Further objects of the invention include the provision of a sinuously corrugated, composite wire spring structure of the type referred to above which has the free end portion of the shorter arm of its supporting member angularly offset in a direction toward the longer arm of such member to permit under load shifting of the apex of the cantilever-like supporting member; which includes in the offset end portion of such shorter arm a bend extended in a direction away from the longer arm of such supporting member; which includes in the longer arm between its opposite ends a bend to offset the free end of the longer arm in a direction away from the short arm to counteract outward bulging of such longer arm, and which includes in the longer arm of the supporting member a bend arranged near the end of such longer arm to effect extension of the end portion of the longer arm in a direction substantially parallel to the end portion of the supporting and attachment means of the wire member to facilitate mounting of the longer arm on a frame structure adjacent to the end portion of such supporting and attachment means of the wire member and to permit direct attachment of the longer arm to the end portion of a supporting and attachment means.

Additional objects and novel features of construction, combinations and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1 is a fragmentary plan view of a seat back-spring construction mounted on a frame, the spring construction being assembled from wire spring structures made and attached to the frame in accordance with the invention;

Fig. 2 is a sectional view through the spring construction shown in Fig. 1, the section taken on line 2—2 of Fig. 1, showing a frame and an elongated spring member mounted by its supporting and attachment means on the frame and the spring member having the central portion of its resting portion supported by a cantilever-like supporting member extended from the central portion and secured with its end to the top rail of the frame adjacent to the end of the upper supporting and attachment means of the spring member;

Fig. 3 is a sectional view similar to Fig. 2, showing the end of the supporting arm of a cantilever-like supporting member mounted on the bottom rail of the frame adjacent to the end of the lower supporting and attachment means of the spring member;

Fig. 4 is a side-view of the elongated wire spring member of the spring construction shown in Fig. 3, and Fig. 5 is a side-view of the cantilever-like supporting member of the spring construction shown in Fig. 3;

Fig. 6 is a sectional view similar to Fig. 2, showing a spring structure with a somewhat modified cantilever-like supporting member;

Fig. 7 is a side-view of the elongated wire member of the spring structure shown in Fig. 6, and Fig. 8 is a side-view of the modified cantilever-like supporting member shown in Fig. 6;

Fig. 9 is a sectional view similar to Fig. 2, showing a spring structure in which the cantilever-like supporting member has its free end portion shaped to provide the upper supporting and attachment means of the spring member;

Fig. 10 is a side-view of the spring member of the spring construction shown in Fig. 9, and Fig. 11 is a side-view of the combined cantilever-like supporting member and the upper supporting and attachment means of the spring member;

Fig. 12 is a sectional view similar to Fig. 2, showing the spring structure assembled from preformed wire elements;

Fig. 13 is a side-view of the wire element forming the resting portion of the wire spring member;

Fig. 14 is a side-view of the wire element forming the upper supporting and attachment means;

Fig. 15 is a side-view of the wire element forming the cantilever-like supporting member, and Fig. 16 is a side-view of the wire element forming the lower supporting and attachment means;

Fig. 17 is a fragmentary sectional view through the front seat structure of an automobile showing another modified form of spring construction in which one of the supporting and attachment means of the wire spring member of each spring structure has mounted thereon the outer end of the cantilever-like supporting member of such spring structure;

Fig. 18 is a fragmentary sectional view through the rear seat structure of an automobile showing a spring construction including spring structures of the type disclosed in Fig. 17;

Fig. 19 is an enlarged fragmentary plan view showing the mounting of the outer end of a cantilever-like supporting member on the supporting and attachment means of a wire spring member, and Fig. 20 is a side-view of Fig. 19;

Figure 21:
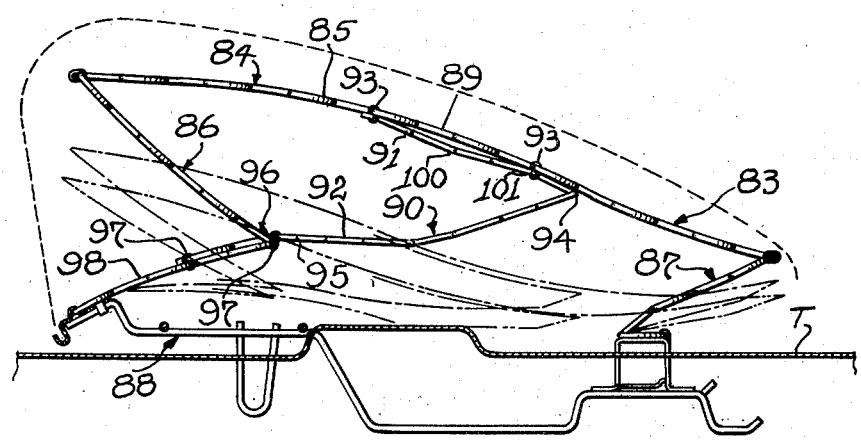
Fig. 21 is a sectional view through a seat spring construction which includes wire seat spring structures, the wire members of which are mounted on a frame in elevated position by front and rear supporting arms and by cantilever-like supporting members secured to the bottom of the wire springs and to the end portions of their front supporting arms.

Referring now in detail to the exemplified form of the seat back-spring structure shown in Figs. 1 and 2 of the drawings, reference numeral 2 represents a fragmentarily shown back-spring construction for automobiles, which construction is mounted on a sheet metal frame 3 having substantially rectangularly shaped open form. This back frame, which includes a top rail 4, a bottom rail 5 and side rails 6, is assembled from sheet metal channels 7 of substantially U-shaped cross section and sheet metal strips 8 seated upon laterally extended flanges 9 of channels 7 and welded to said flanges or otherwise secured thereto. Sheet metal strips 8 form with U-shaped channels 7 the tubular frame 3 which includes in predetermined areas hook-shaped extensions 10 to permit attachment of elongated, sinuously corrugated wire spring structures 11 to the sheet metal strips by engagement of straight cross members 13 of such wire springs with the hook-shaped extensions 10, preferably formed by cutting strip 8 in predetermined areas to form tongue portions and bending such tongue portions out of the plane of strip 8 to hook-shaped form. The top and bottom rails 5 and 6 support the spring structures 11 which bridge frame 3 and are attached to said top and bottom rails by engagement with the hook-shaped extensions 10 of these rails.

Each corrugated wire spring structure 11 embodies an elongated, corrugated wire member 12 made of steel wire bent to sinuous shape so that its loops extend substantially parallel to each other, which wire member has integrally extended from its top and bottom ends 14 and 15 V-shaped supporting and attachment members 16 and 17 formed with sharp apexes by axially twisting respective cross members of such wire member. These supporting and attachment members 16 and 17 have extended from their ends short end portions 19 and 20 adapted to seat the wire members on metal strip 8 and securely engage with the hook-shaped extensions 10 thereof when the wire member is mounted on top and bottom rails 4 and 5 of metal frame 3. Each spring structure 11 furthermore includes a cantilever-like supporting member 21 arranged to support a substantially centrally positioned area 25 of elongated, sinuously corrugated wire member 12. Cantilever-like supporting member 21, which is made of steel wire bent to sinuous configuration and torsionally twisted in one of its cross members to give the supporting member substantially V-shaped form and a sharp apex 23, includes a short arm 24 attached to the central bottom area 25 of wire member 12 by clips 26 or in any other suitable manner and a substantially longer arm 27 extended from apex 23 in a direction toward end portion 19 at the end of supporting and attachment member 16. The longer arm 27 is attached to top rail 4 adjacent to end portion 19 by engagement with the respective hook-shaped extension 28 on said top rail 4. Supporting member 21 may be shaped from wire different in gage and properties from the wire shaped to wire member 12, permits construction of a spring structure of any desired yield and load resistance, simplifies the assembly of such wire spring structure and provides such structure with shock absorbing properties to load-shocks, as supporting and attachment member 21, when loaded, opposes by torsional stresses a change in the angular relationship between the arms 24 and 27 of supporting member 21.

Preferably, sinuously corrugated wire member 12 has the top and bottom end portions of its resting surface 29 slightly offset by bends 30 and 31 to facilitate shaping of the resting surface to the load placed thereagainst, furthermore, wire member 12 has the central portion of its resting surface curved away from arm 24 of cantilever-like supporting member 21 to prevent stiffening of the central portion by arm 24 and, finally, excessive bending of arm 27 is avoided by offsetting such arm.

The modified form of wire spring structure 33 shown in Figs. 3 through 5 includes an elongated, sinuously corrugated wire spring member 34 constructed similar to wire spring member 12 of wire spring structure 11. In this case wire spring member 34 has its central portion 35 supported by a V-shaped, cantilever-like supporting member 36, the short arm 37 of which is secured to the bottom face of member 34 by clips 38 and the long arm 39 of which is extended from sharp apex 40 in a direction toward the end portion 20 of supporting and attachment member 17 to permit securing of arm 39 to hook-shaped extensions 41 on lower rail 5 of frame 3 adjacent to end portion 20. In addition, cantilever-like supporting member 36 has end loop 42 of its short arm 37 offset in a direction toward the longer arm 39 to permit shifting of the apex 40 of supporting member 36.

The modified form of wire spring structure 43 shown in Figs. 6 through 8 discloses a wire spring structure similar to the structure shown in Figs. 1 and 2, with the exception that the cantilever-like supporting member 44 has the end loop 45 of its short arm 46 offset in a direction toward longer arm 47.

In the modified form of wire spring structure 48 shown in Figs. 9 through 11 elongated, sinuously corrugated wire member 49 includes only at its bottom end portion 50 a V-shaped supporting and attachment member 51, and cantilever-like supporting member 52 has its long arm 53 extended to form a V-shaped supporting and attachment member 54 which is secured to top end portion 55 of wire member 49 by clips 56.

The modified form of wire spring structure 57 shown in Figs. 12 through 16 has its elongated, sinuously corrugated wire member 58 assembled from an elongated, substantially straight, sinuously corrugated wire element 59 and two V-shaped supporting and attachment wire elements 60 and 61 secured to wire element 59 by clips 62. Cantilever-like supporting member 63 is shaped similar to member 44 shown in Fig. 8.

Wire spring structures of the type disclosed in Figs. 3, 6, 9 and 12 when subjected to ordinary loads take shapes indicated in these figures by dotted lines, showing the possible yield of the structures under excessive loads and shock-loads which mainly are counteracted by a change in the angular relationship of the two arms of the V-shaped cantilever-like supporting members. To simplify mounting of wire spring structures of this type one of the supporting and attachment members of the wire member may be directly coupled with the end portion of the longer arm of the cantilever-like supporting member forming a wire spring structure similar to the structure shown in Fig. 9. Such a wire spring structure is disclosed in Figs. 17 and 18, Fig. 17 of which shows a wire spring structure of this type in the back structure of an upholstered front seat construction of an automobile and Fig. 18 of which shows such wire structure arranged in the back seat structure of an upholstered rear seat construction of an automobile. In these figures the wire spring structure 64 includes an elongated, sinuously corrugated wire member 65 which is assembled from an elongated, straight or slightly curved, sinuously corrugated wire element 66 and two V-shaped supporting and attachment wire elements 67, 68 secured to wire element 66 by clips 69. Wire member 65, which has its bottom attachment and supporting element 68 secured to bottom rail 70 of frame 71 in any suitable manner, has the central portion of wire element 66 supported by a V-shaped, cantilever-like supporting member 72, the shorter arm 73 of which is attached to element 66 by clips 74 and the longer arm 75 of which is secured to top rail 76 of frame 71. Longer arm 75 has attached thereto by means of clips 77 the supporting and attachment member 67 which with its end portion 78 is extended through arm 75 and has its two cross members 79 and 80 aligned with cross members 81 and 82 of arm 75. Cross members 79, 80, 81 and 82 contact each other at opposite faces of arm 75.

Figs. 17 and 18 show in dash-dotted lines the shapes of wire spring structures when subjected to ordinary loads and in dotted lines the shapes when the wire spring structures are subjected to load-shocks. However, as in these wire spring structures shock-load deformations generally do not effect contact between the arms 73 and 75 of the cantilever-like supporting members 72, the remaining angular relationship of such arms is available for absorbing excessive shock-loads. This action of the wire spring structures is particularly important for back spring constructions of back seat structures of automobiles when the spring constructions are located close to the frame structure F of the automobile and under shockloads contact the frame structure with the arms 75 of supporting members 72 (see Fig. 18). Such contact of arms 75 with frame structure F effects material stiffening of the spring structures which under such conditions readily absorb and withstand substantial excessive shock loads.

Figure 22:
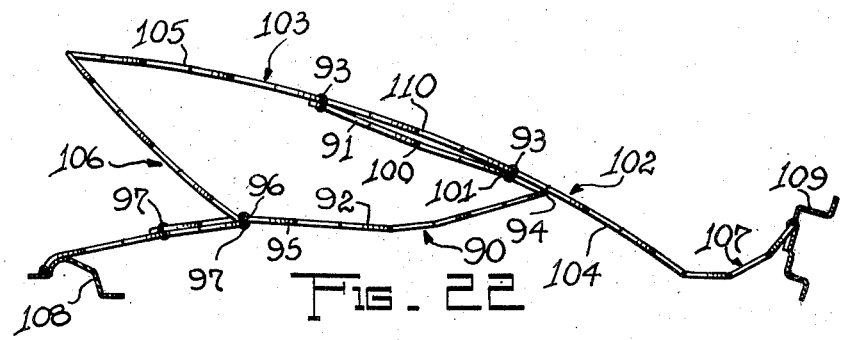
Fig. 22 is a sectional view through a somewhat modified seat structure including cantilever-like supporting members of the type shown in Fig. 21.
Figure 23:
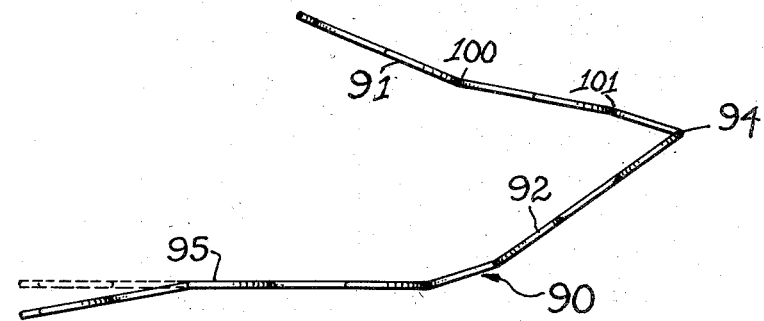
Fig. 23 is an enlarged side-view of one of the cantilever-like supporting members used in the spring constructions shown in Figs. 21 and 22.

Wire spring structures of the type disclosed, though particularly suitable for back spring constructions, may readily be used for seat spring constructions as shown in Figs. 21 through 23. In these figures the seat spring construction shown in Fig. 21 discloses seat spring structures 83, each of which embodies an integrally shaped, sinuously corrugated wire spring 84 formed with an elongated seating portion 85, a downwardly extended V-shaped front supporting arm 86 and a downwardly and forwardly extended rear supporting arm 87. The wire springs 84 are mounted by front and rear supporting arms 86 and 87 in elevated position upon a wire supporting frame 88 having attached thereto the end loops of the front and rear supporting arms in any suitable manner. The seating portion 85 of each spring has its central portion 89 additionally supported by a V-shaped, cantilever-like supporting member 90 including a short arm 91 and a longer arm 92. This supporting member engages with short arm 91 the central area of the bottom face of seating portion 85, which short arm is attached to seating portion 85 by clips 93 arranged in spaced relation with respect to each other. The longer arm 92 of supporting member 90 is extended from apex 94 at an angle to short arm 91 and is bent in predetermined areas by torsionally twisting predetermined cross members to extend end portion 95 of arm 92 toward and through the apex 96 of the V-shaped front supporting arm 86 and attach said end portion by clips 97 to lower arm portion 98 of the front supporting arm 86. Preferably, short arm 91 which includes bends 100 and 101 and is connected by the clips 93 to seating portion 85 has such clips spaced several times the distance between adjacent cross members of member 90 to permit under load proper deformation of the seating portion 85 and avoid stiffening of its central portion 89.

Wire spring structures of the type shown in Fig. 21 are most suitable for seat constructions arranged above mechanical obstructions such as the customary tunnels T for automobile drive shafts, which tunnels extend substantially above the floor line of the automobile. These wire spring structures when subjected to normal loads are deformed as diagrammatically indicated in dash-dotted lines in Fig. 21 and when subjected to shock-loads are deformed to contact the mechanical obstructions—as indicated in dash-double-dotted lines in Fig. 21—which contact effects shortening of the active length of arms 95 of supporting members 90, materially stiffens the wire spring structures and increases its shock absorbing ability of excessive shock loads.

The seat spring construction 102 of Fig. 22 embodies seat spring structures 103, each of which includes an integrally shaped, sinuously corrugated wire spring 104 having an elongated seating portion 105, a V-shaped, downwardly extended front supporting arm 106 and an upwardly and rearwardly extended rear supporting arm 107. These wire springs, which have their supporting arms attached to front and rear rails 108 and 109, each include a V-shaped, cantilever-like supporting member 90 for additionally supporting the central portion 110 of the seating portion 105 and this supporting member is attached to the wire springs in the manner shown and described with reference to Fig. 21.

Having thus described my invention, what I claim is:

1. A wire spring structure for spring constructions comprising an elongated, sinuously corrugated wire member, supporting and attachment members at least one of which is V-shaped extended from opposite end portions of said wire member, and a V-shaped cantilever-like supporting member for the central area of said wire member, said cantilever-like supporting member including a short arm attached to the central bottom area of the wire member and a long arm extended from said short arm in acute angular relation with respect thereto toward said V-shaped supporting and attachment member, said long arm being attached to the V-shaped supporting and attachment member.

2. A wire spring structure as described in claim 1, wherein the said V-shaped supporting and attachment member of said wire member is extended downwardly from said wire member to support same in an elevated position on a frame and wherein the long arm of said V-shaped cantilever-like supporting and attachment member is attached to one of the arms of said V-shaped supporting and attachment member.

3. A wire spring structure as described in claim 1, wherein the V-shaped supporting and attachment member of said wire member has extended therefrom the outer end of the long arm of the V-shaped cantilever-like supporting member.

4. A wire spring structure as described in claim 1, wherein the V-shaped cantilever-like supporting member is of zigzag configuration and includes in its short arm offsetting bends to offset the middle portion of the short arm in a direction away from the bottom surface of the elongated, sinuously corrugated wire spring having the said short arm attached thereto.

5. A wire spring structure as described in claim 1, wherein the V-shaped cantilever-like supporting member is of zigzag configuration and includes a sharp apex, wherein a portion of the short arm of the V-shaped cantilever-like supporting member is offset in a direction toward the long arm thereof, and wherein the offset portion of the short arm is attached to the central bottom area of the wire member.

6. A wire spring structure for spring constructions comprising an elongated, sinuously corrugated wire member, supporting and attachment members extended from opposite end portions of said wire member, said supporting and attachment members including at least one V-shaped member, and a cantilever-like V-shaped supporting member including a short arm attached to the central bottom area of the wire member and a long arm extended in acute angular relation to the short arm toward the V-shaped supporting and attachment member and attached thereto.

7. A wire spring structure for spring constructions comprising an elongated, sinuously corrugated wire member, a V-shaped supporting and attachment member extended from one end portion of said wire member, and a cantilever-like supporting member including a short arm rigidly attached to the central bottom area of the wire member and a long arm extended in acute angular relation to the short arm toward the said V-shaped supporting and attachment member and rigidly attached thereto.

8. A wire structure for spring constructions as described in claim 7, wherein the V-shaped supporting and attachment member for said elongated, sinuously corrugated wire member is of zig-zag configuration and wherein the long arm of the cantilever-like supporting member intersects the said supporting and attachment member, extends therethrough and is rigidly secured to the end portion thereof.

9. A wire spring structure for spring constructions as described in claim 7, wherein the V-shaped supporting and attachment member for the elongated, sinuously corrugated wire member is of zigzag configuration and wherein the long arm of the cantilever-like supporting member is extended through the apex of the V-shaped supporting and attachment member and rigidly attached thereto.

10. The combination of an automobile body including portions protruded into the interior of the body with a wire spring construction in said body mounted opposite the said protruding portions thereof, said wire spring construction embodying parallelly arranged supporting means mounted on said body and wire spring structures supported on said supporting means in parallel elevated position with respect thereto, said wire spring structures including elongated, sinuously corrugated wire members and supporting and attachment members at least one of which is V-shaped, said supporting and attachment members being extended from the ends of said corrugated wire members and attached to the supporting means, and V-shaped cantilever-like supporting members including short arm means rigidly attached to the central bottom portions of the wire members and long arm means extended from said short arm means in acute angular relationship with respect thereto toward the said one V-shaped supporting and attachment members of the wire members and attached to the said V-shaped supporting and attachment members, said cantilever-like supporting members arranged to be additionally supported when the wire spring construction is subjected to excessive shock loads by effecting under excessive shock loads contact of the long arm means of said cantilever-like supporting means with said protruding portions of the automobile body.

References Cited in the file of this patent

UNITED STATES PATENTS

| | | |
|---|---|---|
| 2,568,829 | Scott et al. | Sept. 25, 1951 |
| 2,571,184 | Bateman et al. | Oct. 16, 1951 |
| 2,591,185 | Neely | Apr. 1, 1952 |

FOREIGN PATENTS

| | | |
|---|---|---|
| 662,212 | Great Britain | Dec. 5, 1951 |